United States Patent Office 2,825,737
Patented Mar. 4, 1958

2,825,737

PURIFICATION OF DIMETHYL TEREPHTHALATE

Alfred Saffer, Bayside, N. Y., and Robert S. Barker, Plainfield, N. J., assignors, by mesne assignments, to Mid-Century Corporation, Chicago, Ill., a corporation of Delaware No Drawing. Application December 8, 1954
Serial No. 474,033

4 Claims. (Cl. 260—475)

This invention relates to processes for the preparation of high-purity dimethyl terephthalate.

As pointed out in U. S. Patent 2,646,393, there is a need for very high-purity dimethyl terephthalate of the order of 99.90% pure or more, and very difficult and costly procedures have been regarded by the art as necessary for preparing such material.

The discoveries associated with the invention and relating to improvements in the manufacture of high-purity dimethyl terephthalate and objects achieved in accordance with the invention include: the provision of a process for preparing at least 99.90% purity dimethyl terephthalate by reacting methyl alcohol with terephthalic acid (which may be obtained by the catalytic oxidation of a para-dialkylbenzene having about 1 to 4 carbon atoms or more in each alkyl group) in the presence of an acidic or basic catalyst, filtering, crystallizing dimethyl terephthalate from the filtrate, and then distilling the crystallized dimethyl terephthalate, the center or heart cut being the desired high-purity product; and other objects which will be apparent as details or embodiments of the invention are set forth hereinafter.

In order to facilitate a clear understanding of the invention, the following specific embodiments are described in detail:

Example 1

In a glass-lined pressure vessel (or equivalent corrosion resistant apparatus) a mixture of 1,000 parts by weight terephthalic acid
10 parts zinc oxide
5 parts fine zinc powder
16,000 parts methanol (anhydrous)

is heated with refluxing at about 180° C. and 400 p. s. i. g. (pounds per square inch gage) for 12 hours or until a sample shows the presence of 2% or less of monoester of terephthalic acid as determined by titration for acidity. Then the resulting mixture is cooled to 60° C., filtered (to remove solid catalyst, and unreacted terephthalic acid, if any), and the filtrate cooled to 25° C. Dimethyl terephthalate which crystallizes out is separated, e. g. by filtration, and then distilled in an about 10 plate fractionating column (of glass or equivalent corrosion resistant material) at a pressure of about 20 to 30 mm. Hg absolute and a temperature in the range of 165 to 175° C.

The first cut thereof, about 10% by weight of the charge, is separated, and may be recycled for further purification. The middle or heart cut, about 80%, constitutes the main product. It contains 99.94% dimethyl terephthalate. The residue in the still pot contains the monoester of terephthalic acid, if any, and it may be recycled to the esterification step, for conversion to the full ester.

The product obtained in accordance with this example clearly meets the above-mentioned high-purity requirements, and at the same time eliminates several recrystallization or distillation steps regarded as necessary heretofore.

Where the esterification step is carried substantially to completion, there may be substantially no monoester residue in the fractionating column, and accordingly no recycling thereof should be necessary.

Comparable or analogous results to the foregoing may be achieved with various modifications thereof, such as the following: Any esterification catalyst may be used, of either the acidic or the basic types. These may be typified by sulfuric acid, toluene sulfonic acid, hydrogen chloride, lead oxide, alkane sulfonic acids, and sodium methoxide. The weight ratio of methanol to terephthalic acid may be in the range of 4 to 25. The esterification temperature may be in the range of 60 to 200° C. and the pressure in the range of 0 to 750 p. s. i. g. The reaction time should be sufficient to give substantially complete esterification, e. g. in the range of 0.5 to 40 hours. The esterification reaction mixture may be filtered at a temperature in the range of 60° C. to operating temperature. It is preferred to cool the filtrate to a temperature in the range of 15 to 25° C., whereby dimethyl terephthalate is crystallized out, separated (such as by filtration or centrifuging) and distilled. Where all the advantages of the invention are not required, the reaction mixture filtrate may be distilled directly.

The distillation may be carried out in a column having 3 to 15 theoretical plates, or height of packing equivalent thereto. The distillation pressure may be in the range of 12 to 760 mm. Hg, and the temperature in the range of 145 to 300° C., the two being interrelated in the usual manner, the higher temperature being associated with the higher pressure. The first or major impurity containing cut may be 2 to 15% of the charge to the fractionating column. The heart cut may be 70 to 95% of the charge, providing it meets the purity requirements.

Any or all the steps may be carried out in a continuous, intermittent or batch manner. In a continuous operation, the unreacted residue and catalyst could be separated from the reaction mixture, the latter optionally cooled to crystallize the dimethyl terephthalate and the later continuously removed and passed to the fractionation step. In the event an acid esterification catalyst is employed, a neutralization with soda ash should precede the cooling of the reaction mixture to crystallize dimethyl terephthalate. The first fractionation cut may be recycled continuously to the fractionating column or mixed with the hot esterification reaction product.

The desired product may be removed as a side-stream from the fractionating column, and any monoester in the lower part of said column may be continuously recycled to the esterification step.

In view of the foregoing disclosures, variations and modifications thereof will be apparent to one skilled in the art and it is intended to include within the invention all such variations and modifications except as do not come within the scope of the appended claims.

We claim:

1. A process for the preparation of high purity dimethylterephthalate comprising reacting methyl alcohol with terephthalic acid in the presence of a catalyst to give substantially complete esterification, separating catalyst and solids from the reaction mixture liquid at a temperature above about 60° C., crystallizing and separating dimethylterephthalate from the reaction mixture liquid at a temperature from below 60° C. to 15° C. and fractionally distilling said dimethylterephthalate at a pressure of 12 to 760 mm. Hg and a temperature of from 145 to 300° C. to separate a first major impurity cut of about 2 to 15% of the distillation charge and then separating a heart cut compising 70 to 95% of the distillation charge of at least 99.9% purity dimethylterephthalate.

2. A process for the preparation of high purity dimethylterephthalate comprising reacting methyl alcohol with terephthalic acid in the presence of a catalyst to give substantially complete esterification, separating catalyst and solids from the reaction mixture liquid at a temperature of 60° C., crystallizing and separating dimethylterephthalate from the resulting reaction mixture liquid at a temperature of 25° C., fractionally distilling said dimethylterephthalate at a pressure of from 20 to 30 mm. Hg and a temperature of 165° to 175° C. to separate first a major impurity cut of about 10% of the distillation charge and then separating a heart cut comprising 80% of the distillation charge of at least 99.90% purity dimethylterephthalate.

3. In a process for the preparation of high purity dimethylterephthalate comprising reacting methyl alcohol with terephthalic acid in the presence of a catalyst to give substantially complete esterification, the improved steps comprising: separating catalyst and solids from the reaction mixture liquid at a temperature of 60° C., crystallizing dimethylterephthalate from said reaction mixture liquid at a temperature of 25° C. and fractionally distilling said dimethylterephthalate at a pressure of 20 to 30 mm. Hg and a temperature of 165° to 175° C. to separate first a major impurity cut of about 10% of the distillation charge and then separating a heart cut comprising 80% of the distillation charge of 99.94% purity dimethylterephthalate.

4. In a process for the preparation of high purity dimethylterephthalate by reacting methyl alcohol with terephthalic acid in the presence of a catalyst to give substantially complete esterification, the improvements comprising: separating catalyst and solids from the reaction mixture liquid at a temperature above about 60° C., crystallizing dimethylterephthalate from the reaction mixture liquid at a temperature in the range of 15–25° C. and fractionally distilling dimethylterephthalate at a pressure of 12 to 760 mm. Hg and a temperature of from 145° to 300° C. wherein during the fractional distillation there is first separated a major impurity cut of about 2 to 15% of the distillation charge and then separated a heart cut of dimethylterephthalate of purity of 99.90% or more comprising 70 to 95% of the distillation charge.

References Cited in the file of this patent

UNITED STATES PATENTS

| | | |
|---|---|---|
| 2,459,014 | Cavanaugh et al. | Jan. 11, 1949 |
| 2,491,660 | Gresham | Dec. 20, 1949 |